US010333752B2

(12) United States Patent
Jiang et al.

(10) Patent No.: US 10,333,752 B2
(45) Date of Patent: Jun. 25, 2019

(54) GUARD-BAND FOR SCALED NUMEROLOGY MULTIPLEXING

(71) Applicant: QUALCOMM Incorporated, San Diego, CA (US)

(72) Inventors: Jing Jiang, San Diego, CA (US); Tingfang Ji, San Diego, CA (US); Peter Gaal, San Diego, CA (US); Brian Clarke Banister, San Diego, CA (US); Joseph Binamira Soriaga, San Diego, CA (US); Krishna Kiran Mukkavilli, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 14/979,951

(22) Filed: Dec. 28, 2015

(65) Prior Publication Data

US 2016/0269135 A1 Sep. 15, 2016

Related U.S. Application Data

(60) Provisional application No. 62/133,201, filed on Mar. 13, 2015.

(51) Int. Cl.
*H04J 3/00* (2006.01)
*H04L 27/26* (2006.01)
*H04L 5/00* (2006.01)

(52) U.S. Cl.
CPC ........ *H04L 27/2602* (2013.01); *H04L 5/0037* (2013.01); *H04L 27/2607* (2013.01)

(58) Field of Classification Search
USPC ....... 370/328, 329, 210, 335, 350, 208, 252, 370/324, 338, 344, 480, 503, 504, 505, 370/506, 507, 508, 509, 510, 511, 512, 370/513, 514, 515, 516, 517, 518, 519, 370/520
See application file for complete search history.

(56) References Cited

U.S. PATENT DOCUMENTS

| 8,077,595 | B2 | 12/2011 | Bhushan et al. | |
| 8,503,366 | B2 | 8/2013 | Ikeda | |
| 8,675,570 | B2 | 3/2014 | Cai | |
| 8,837,397 | B2 | 9/2014 | Zheng | |
| 2007/0268812 | A1* | 11/2007 | Yoon | H04L 1/0006 370/203 |

(Continued)

OTHER PUBLICATIONS

International Search Report—PCT/US2016/018455—ISA/EPO— dated Mar. 5, 2016 pp. 1-3.

(Continued)

*Primary Examiner* — Phuongchau Ba Nguyen
(74) *Attorney, Agent, or Firm* — Linda G. Gunderson; Haynes & Boone, LLP

(57) ABSTRACT

A method of multiplexing scaled numerology OFDM waveforms in an orthogonal frequency division multiplexing is presented. A first data can be encoded into a first numerology at a first set of tones and a second data can be encoded into a second numerology at second set of tones. A third data can be encoded into a guard band in such a way that the third data can be interpreted under either the first numerology or the second numerology.

26 Claims, 5 Drawing Sheets

(56) References Cited

U.S. PATENT DOCUMENTS

| | | | |
|---|---|---|---|
| 2011/0032850 A1* | 2/2011 | Cai | H04L 5/0023 |
| | | | 370/280 |
| 2011/0216776 A1 | 9/2011 | Barr | |
| 2013/0163501 A1 | 6/2013 | Chen et al. | |
| 2015/0195077 A1 | 7/2015 | Kim et al. | |
| 2015/0349987 A1* | 12/2015 | Soriaga | H04L 25/03834 |
| | | | 370/329 |
| 2016/0352551 A1* | 12/2016 | Zhang | H04L 27/2602 |
| 2018/0048511 A1* | 2/2018 | Hakola | H04J 11/003 |

OTHER PUBLICATIONS

Written Opinion—PCT/US2016/018455—ISA/EPO—dated Mar. 5, 2016 pp. 1-6.
Smee J., "5G Vision and Design", IEEE 5G Summit Silicon Valley, Qualcomm Technologies, Retrieved from the Internet: URL: http://www.5gsummit.org/docs/slides/John-Smee-5GSummit-SiliconValley-11162015.pdf, Nov. 16, 2015 (Nov. 16, 2015), XP055268339, 22 slides.

* cited by examiner

GUARD-BAND FOR SCALED NUMEROLOGY MULTIPLEXING

RELATED APPLICATION

This application claims priority to U.S. Provisional Patent Application 62/133,201, entitled "FlexGuard for Scaled Numerology Multiplexing," by Jing Jiang, et al., filed on Mar. 13, 2015.

RELATED ART

Technical Field

This application relates to wireless communication and, in particular, to waveform modulation and coding.

Background

The 5G mobile standard is currently being formulated and calls for higher data transfer speeds, greater numbers of connections, and better coverage, among other improvements. The 5G standard, according to the Next Generation Mobile Networks Alliance, is expected to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Accordingly, there is a need for development of better transmission/processing techniques for wireless data transmission to meet different requirements of different applications/users at the same time.

SUMMARY

In accordance with some embodiments, a method of transmitting, includes transmitting first data encoded in a first numerology at a first set of tones; transmitting second data encoded in a second numerology at a second set of tones separated from the first set of tones; and transmitting third data in a third set of tones of a guard-band, the third set of tones separating the first set of tones and the second set of tones, wherein the third data is interpretable under either the first numerology or the second numerology.

A method of receiving data according to some embodiments includes receiving first data encoded in a first numerology at a first set of tones; receiving second data encoded in a second numerology at a second set of tones separated from the first set of tones; and receiving third data in a third set of tones of a guard, the third set of tones separating the first set of tones and the second set of tones, wherein the third data is interpretable under either the first numerology or the second numerology.

A transceiver according to some embodiments includes a transmitter coupled to a processor, the transmitter configured to receive from a processor a first data to be encoded in a first numerology at a first set of tones, a second data to be encoded in a second numerology at a second set of tones separated from the first set of tones, and third data to be transmitted in a third set of tones of a guard-band, the third set of tones separating the first set of tones and the second set of tones, wherein the third data is interpretable under either the first numerology or the second numerology; and transmit the first data, the second data, and the third data.

These and other embodiments are more fully discussed below with respect to the following figures.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures. The figures are not to scale.

DETAILED DESCRIPTION

In the following description, specific details are set forth describing some embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings illustrate inventive aspects and embodiments that should not be taken as limiting—the claims define the protected invention. Various changes may be made without departing from the spirit and scope of this description and the claims. In some instances, well-known structures and techniques have not been shown or described in detail in order not to obscure the disclosure.

Figures 1A, 1B:
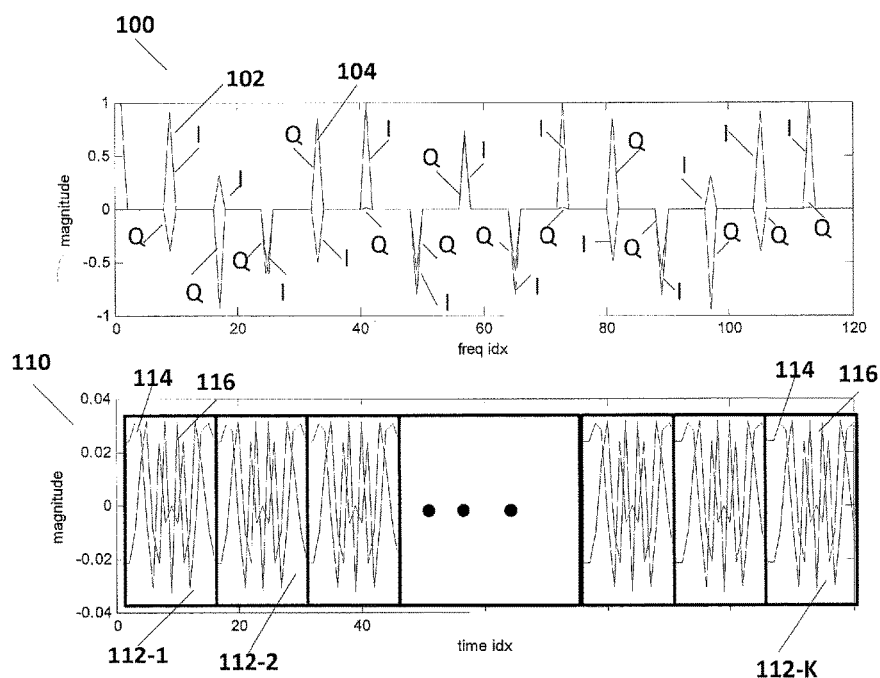
FIG. 1A illustrates a frequency domain waveform of a signal with non-zero values every K tones.
FIG. 1B illustrates the time domain waveform of the frequency domain waveform illustrates in FIG. 1A.

FIGS. 1A and 1B illustrate frequency domain and time domain representations, respectively, of a transmission signal. FIG. 1A illustrates a frequency domain waveform 100 of the transmission signal that is encoded with non-zero values every K tones. In general, any value for K can be used. As shown in FIG. 1A, the imaginary spectrum 102 and quadrature spectrum 104 are illustrated. Peaks of in-phase spectrum 102 are labeled I while peaks of quadrature spectrum 104 are labeled Q. As is illustrated in FIG. 1A, imaginary spectrum 102 and quadrature spectrum 104 are 0 except for the non-zero frequencies, which as discussed above occurs every K tones.

FIG. 1B illustrates the time-domain waveform 110 corresponding to the frequency domain waveform 100 illustrated in FIG. 1A. Waveform 100 includes an in-phase portion 114 and a quadrature portion 116. As illustrated in FIG. 1B, the waveform is repeated K times, into waveform repetitions 112-1 through 112-K. For example, if K=2, the waveform corresponding to the non-zero values in the frequency domain waveform will be repeated twice 112-1 through 112-2. If K=8, then waveform 110 is repeated 8 times 112-1 through 112-8. This waveform ensures partial symbol decodable and is useful in constructing a guard band that effectively separates scaled numerology tones, for example numerical cyclic prefix (NCP) and extended cyclic prefix (ECP) tones, as described below.

Figure 2:
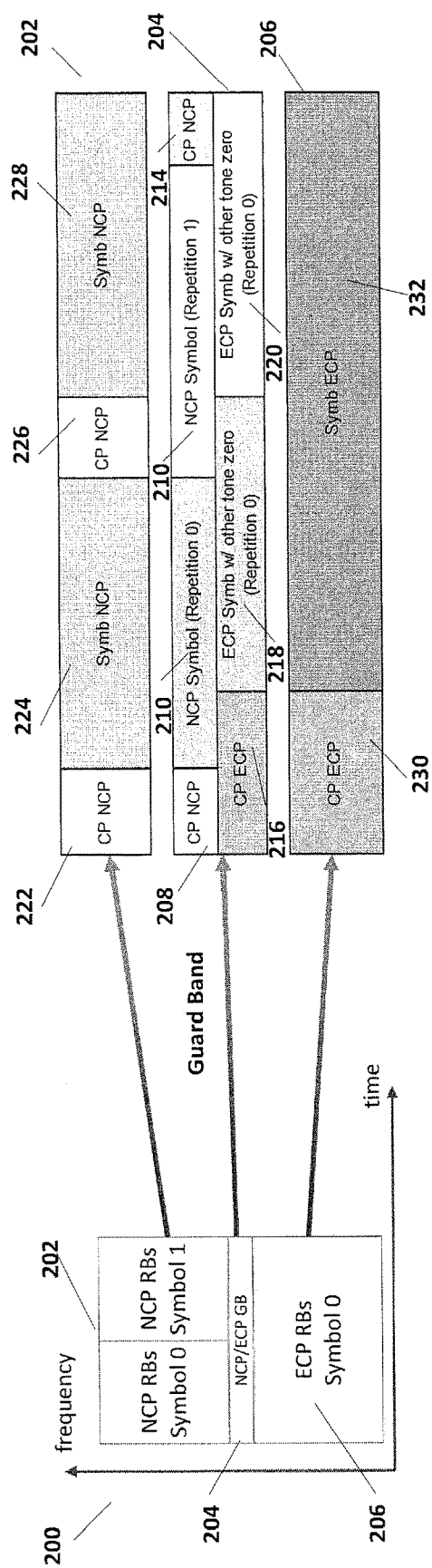
FIG. 2 illustrates a multiplexed data transmission including a guard band that carries a data payload according to some embodiments.

Using the discreet Fourier transform (DFT) properties as is illustrated in FIGS. 1A and 1B, a partial-symbol decodable orthogonal frequency division multiplexing (OFDM) coding can be used to multiplex different numerologies and to provide a data transmission scheme in a guard band that separates the different symbol numerologies. FIG. 2 illustrates a frequency versus time map 200 for two numerologies that can then be multiplexed. Two common numerologies that may be multiplexed according to some embodiments are normal cyclic prefix (NCP) numerology and extended cyclic prefix (ECP) numerology. With a scaled numerology (in this example, scaled by a factor of 2), ECP transmits half the number of symbols in a subframe as does NCP (i.e. 2 NCP symbols is transmitted in the same time frame as 1 ECP symbol, with the 1 ECP symbol having twice the duration as 1 NCP symbol). As an additional consequence, the tone spacing for ECP symbol transmission in frequency division multiplexing (FDM) is half that of NCP symbol transmission. Consequently, orthogonality between the tones used to transmit NCP data and those used to transmit ECP data may be lost.

Many parameters are driven by symbol duration, e.g. cyclic prefix (CP) overhead. Thus, using scaled numerology multiplexing to simultaneously send two waveforms to meet different overhead/latency/link performance requirements at the same time may be beneficial. It is also beneficial to transmit data in the guard band between the frequency bands of the numerologies.

Some embodiments of the present invention, include frequency-division-multiplexing (FDM) numerology multiplexing separated by a guard band (GB). Data can be transmitted in frames 204 in the guard band, which has non-zero data tones spaced every K tones. In some embodiments, K=2 so that every other tone is zero. The receiver (RX) receives and processes data sent in the guard band to ensure acceptable inter-channel interference (ICI) and inter-symbol interference (ISI) performance and appropriate latency. In general, the guard band data can be impacted by ICI from either the NCP numerology frames 202 or the ECP numerology frames 206 depending on receiver processing. The main tradeoff on numerology is that outdoor/macro cell delay spread (DS) impact dictates a longer cyclic prefix (CP) length than indoor/femto cell cases and short symbol duration causing high CP overhead. Therefore, a large symbol duration is required to control the CP overhead.

FIG. 2 illustrates use of data transmission in a guard-band between frequency bands used for transmission of NCP numerology frames 202 and ECP numerology data frames 206. The NCP numerology frame 202 is transmitted in a first set of tones while the ECP numerology frame 206 is transmitted by a second set of tones. The first set of tones and the second set of tones are separated by the guard band, where guard-band frames 204 are transmitted at a set of guard-band tones. In the particular example shown in FIG. 2, ECP numerology data frames 206 are transmitted using lower frequency tones and NCP numerology data frames 202 are transmitter at higher frequency tones. The guard-band frames 204, transmitted in the guard band, are at guard-band tones between the ECP numerology tones and the NCP numerology tones.

FIG. 2 further illustrates the individual timing of the waveforms of the data symbols transmitted. As illustrated, the guard band uses non-zero transmission every K tones, as discussed above with FIGS. 1A and 1B. In one example, K=2 so that the waveforms are repeated. Data can be transmitted in the guard band such that it can be viewed and processed either as NCP numerology data or as ECP numerology data. As illustrated in FIG. 2, guard-band frames 204 viewed as NCP can include repetition of the same NCP symbol 210, the first copy with an attached prefix (CP) 208 and the second copy with an attached postfix 214. In some embodiments, guard-band frame 204 can be interpreted as two NCP symbols, both symbols with a prefix CP. The guard-band data can be viewed as ECP with partial-symbol decodable property (or interleaved-FDMA property). With K=2, as is illustrated in FIG. 2, every other tone being zero, the transmitted waveform is repeated in pairs. Accordingly, tones in the guard band do not introduce ICI to either NCP data transmitted in the NCP band or ECP data transmitted in the ECP band. Tones in the guard band can be decoded with limited ICI as either NCP frames or ECP frames. In some multiplexing, K may be set at other values. In particular, K can be set according to the numerologies that are being multiplexed. For example, for multiplexing NCP and indoor numerology, K may be set to four (4) so that the waveform of the guard-band data transmission may be repeated four times. In general, K is related to the ratio of the number of symbols transmitted by the first numerology and the second numerology in a given time period.

As illustrated in FIG. 2, map 200 shows an NCP frame 202, an ECP frame 206, and a guard-band frame 204 in intermediate tones between NCP frame 202 and ECP frame 206. As shown in FIG. 2, NCP frame 202 includes a first CP 222, a first symbol 224, a second CP 226, and a second symbol 228. ECP frame 206 includes an ECP CP 230 and an ECP symbol 232. As illustrated in FIG. 2, NCP frame 202 and ECP frame 206 have the same duration. FIG. 2 also illustrates guard-band frame 204. Guard-band frame 204 can be interpreted by a receiver as either an NCP frame or an ECP frame.

Figure 3:
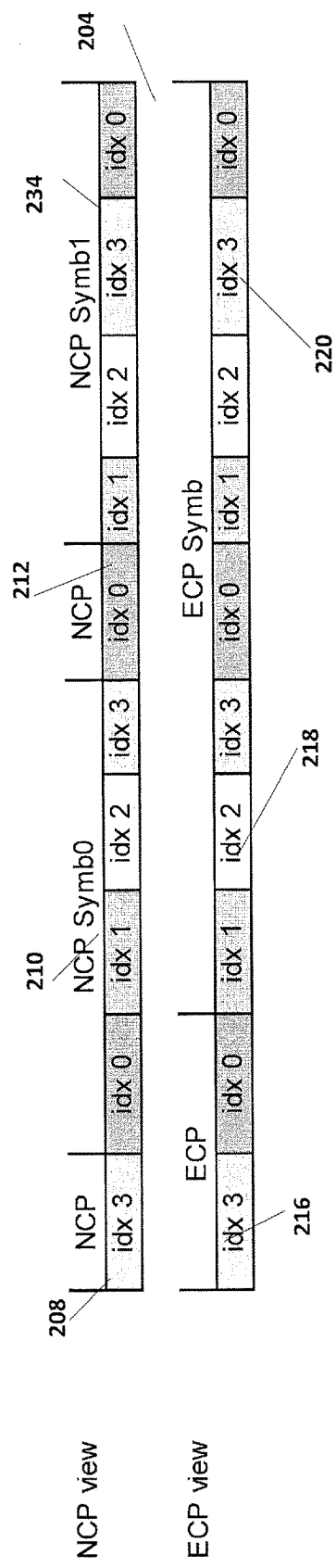
FIG. 3 illustrates the equivalence between normal cyclic prefix (NCP) and extended cyclic prefix (ECP) symbols.

FIG. 3 further illustrates another alignment, or multiplexing, of guard-band frame 204. As discussed above, guard-band frame 204 can include transmitted data and can be interpreted either under the NCP numerology or the ECP numerology. As is illustrated in FIG. 3, guard-band frame 204 includes a repeating waveform with waveform segments idx0, idx1, idx2, and idx3. Guard-band frame 204 is aligned so that the order of the repeating waveform is idx3, idx0, idx1, idx2 and repeating. As such, under a NCP interpretation, CP 208 is idx3, NCP symbol 210 is formed of idx0, idx1, idx2 and idx3, CP 212 is formed of idx0, and NCP symbol 234 is formed of idx1, idx2, idx3 and idx0. However, if interpreted under an ECP interpretation, the ECP CP 216 is idx3 and idx0 while the ECP symbol, formed of repeated symbols 218 and 220, is given by idx1, idx2, idx3, idx0, idx1, idx2, idx3, and idx0. Under either interpretation, the data encoded in the waveform of guard-band frame 204 can be recovered.

As discussed above, FIG. 3 illustrates the equivalence, with every other tone being 0 (K=2), between ECP numerology and NCP numerology. As illustrated, the waveform is repeated and includes cyclically shifted symbols represented by signal segments idx0, idx1, idx2, and idx3. As illustrated, the waveform can start with segment (idx) 3 and process through waveform segment idx0 through idx3 twice, finishing with waveform segment idx0. Consequently, a first NCP symbol is formed of waveform segments idx0, idx1, idx2, idx3 while a second NCP symbol is formed of waveform segments idx1, idx2, idx3, idx0 (repetition of waveform with phase ramp in frequency, which ensures continuous phase waveform in time domain accounting for CP). Note that the arrangement illustrated in FIG. 2, symbol 210 is repeated and post CP 214 is idx0.

Viewing the same waveform as ECP numerology, then, results in an ECP that includes segments idx3 and idx0 and a repeated ECP symbol formed of segments idx1, idx2, idx3, idx0. With this equivalence, the waveform in the guard band could be interpreted as either NCP or ECP numerology, hence not interfering either side. A receiver can receive the guard band data as either NCP or ECP numerology and recover the transmitted data with ICI from either ECP or NCP side.

Any given cell is deployed with a default numerology based on the cell size and requirements. However, different numerologies can be multiplexed as discussed above within the same cell. For example, NCP mission-critical (MiCr) user equipment (UE) numerology, in some cases with pre-equalization, can be used to meet latency requirements. ECP nominal high throughput Tput UE can be used to meet low ICI/ISI noise floor requirements. In FDM, a guard band (GB) with partial-decodable symbol structure can be used to control ICI. ICI between NCP Micro and ECP nominal numerologies can be mitigated by a guard band (for example of width<1 MHz) plus a weighted overlap add (WOLA) processing (e.g. $1/16$~$1/8$ of symbol duration). Because of the NCP MiCr latency requirements, time-division multiplexing (TDM) is not a feasible solution.

As discussed above, NCP and ECP can be multiplexed where NCP and ECP tones are separated by a guard band with partial-symbol decodable tones to ensure negligible ICI from guard band to either NCP or ECP data tone regions. Residual NCP to ECP ICI can be managed by WOLA and the separation of the guard band.

Figure 4:
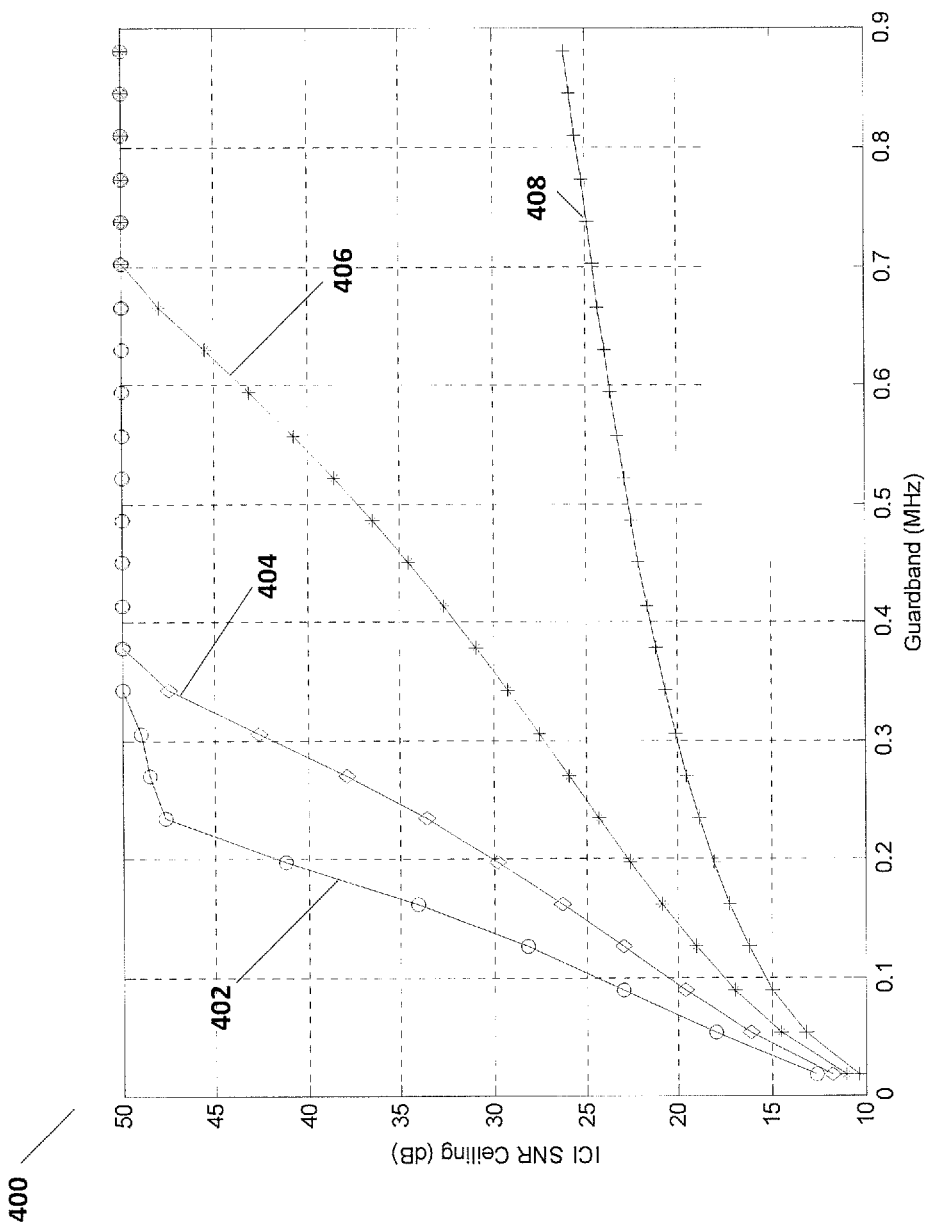
FIG. 4 illustrates the signal-to-noise (SNR) ceiling due to inter-channel interference (ICI) as a function of guard-band utilization for various values of weighted overlap add roll-off.

FIG. 4 illustrates the tradeoff between the guard band size, WOLA rolloff factor and ICI. FIG. 4 illustrates a graph 400 of the signal-to-noise ratio (SNR) ceiling due to ICI as a function of guard band. As shown in FIG. 4, curve 402 illustrates the SNR ceiling with a WOLA roll-off of 0.1875; curve 404 illustrates the SNR ceiling with a WOLA roll-off of 0.125; curve 406 illustrates the SNR ceiling with a WOLA roll-off of 0.0625; and curve 408 illustrates the SNR ceiling with no WOLA roll-off. As shown in FIG. 4, the NCP to ECP ICI SNR ceiling can be greater than 40 dB, with the guard band being 0.5 MHz and the WOLA rolloff=$1/16$.

Figure 5:
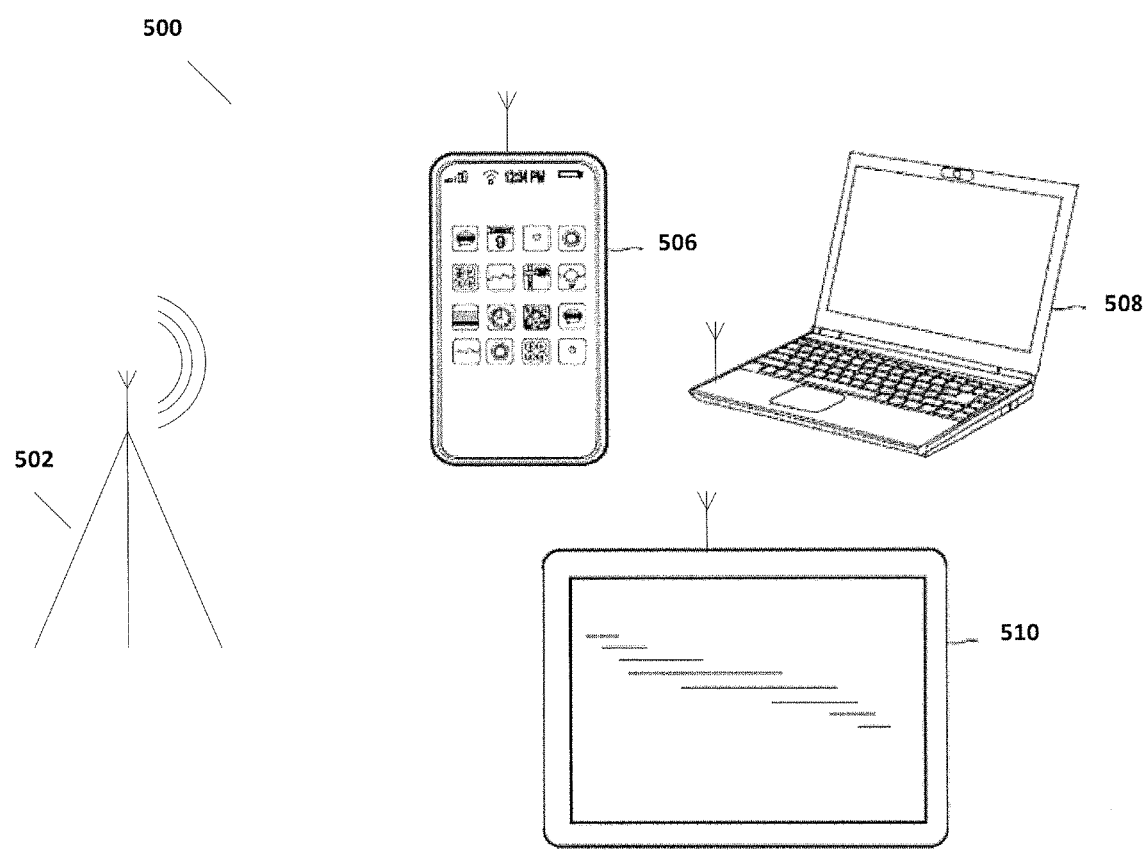
FIG. 5 illustrates various devices that may include data transmission according to some embodiments.

Transmission of data as disclosed herein may be incorporated into a wide variety of electronic systems. For example, as shown in FIG. 5, a cell phone 506, a laptop 508, and a tablet PC 510 may all be configured to transmit and receive data as disclosed herein with a cell tower 502 or other devices. In particular, FIG. 5 depicts a cell tower 502 configured to transmit and receive data as disclosed herein to devices such as cell phone 506, lap-top 508, and tablet 510. Other exemplary electronic systems such as a music player, a video player, a communication device, and a personal computer may also be configured with the ability to transmit and receive data as described in this disclosure.

Figure 6:
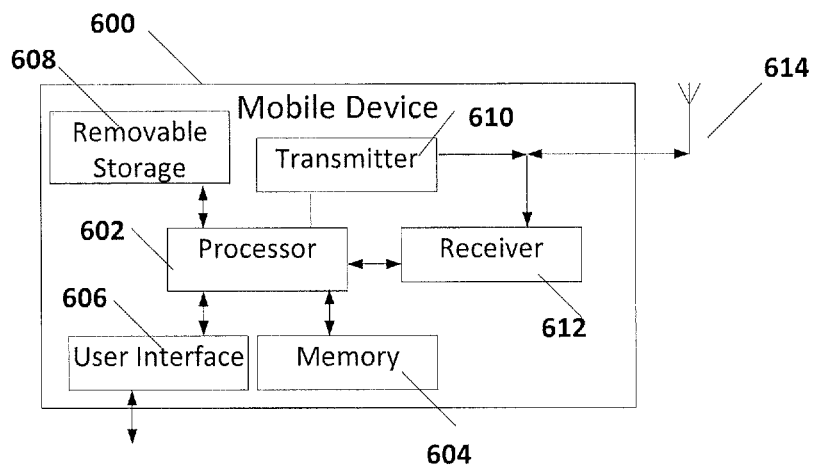
FIG. 6 illustrates a transceiver that may be included in the various devices illustrated in FIG. 5.

FIG. 6 illustrates a transceiver 600 that may be included in devices such as those illustrated in FIG. 5. Transceiver 600 transmits and receives data as disclosed above. As is illustrated in FIG. 6, transceiver 600 may be controlled by a processor 602. Processor 602 may include one or more microprocessors or other devices capable of manipulating data. Processor 602 may be coupled to a memory 604, which may be any combination of volatile and non-volatile memory. Memory 604 may store data, provide registers for buffering data, and provide storage for programming executed by processor 602. Processor 602 may further be coupled to removable storage 608, which may include disk drives, USB ports, or other removable memory storage devices for loading programming and data into memory 604 or storing programming and data executed or manipulated by processor 602. In particular, removable storage 608 may receive physical storage media that stores programming for processor 602 to transmit and receive data as discussed above. Processor 602 may further by coupled to a user interface 606, through which a user may monitor and interact with transceiver 600.

Further, as is illustrated in transceiver 600, processor 602 provides data to transmitter 610 for transmission through antenna 614. Transmitter 610 receives data frames for two numerologies and the multiplexed guard band frames and transmits frames as described, for example, in FIGS. 2A and 2B. Additionally, receiver 612 may provide data to processor. Receiver 612 receives signals from antenna 614 and provides data for two numerologies and the multiplexed guard band frames to processor 602.

In the preceding specification, various embodiments have been described with reference to the accompanying drawings. It will, however, be evident that various modifications and changes may be made thereto, and additional embodiments may be implemented, without departing from the broader scope of the invention as set for in the claims that follow. The specification and drawings are accordingly to be regarded in an illustrative rather than restrictive sense.

We claim:

1. A method of transmitting, comprising:
   transmitting from a transmitter first data encoded in a first numerology at a first set of tones to form a first numerology frame;
   transmitting from the transmitter second data encoded in a second numerology at a second set of tones separated from the first set of tones to form a second numerology frame; and
   transmitting from the transmitter third data in a third set of tones of a guard-band to form a guard frame, the third set of tones separating the first set of tones and the second set of tones and the third data is encoded to multiplex the third data in the first numerology and the third data in the second numerology into the guard frame,
   wherein the encoded third data is decodable when received by a receiver under either the first numerology or the second numerology from the guard frame.

2. The method of claim 1, wherein the first numerology is a normal cyclic prefix numerology and the second numerology is an extended cyclic prefix numerology.

3. The method of claim 1, wherein the first numerology is a normal cyclic prefix numerology and the second numerology is an indoor numerology.

4. The method of claim 1, further including receiving a fourth data encoded in the first numerology, a fifth data encoded in the second numerology, and a sixth data encoded in the third set of tones of the guard band.

5. The method of claim 4, wherein receiving the fourth data, the fifth data, and the sixth data comprises performing weighted overlap add processing.

6. A method of receiving data, comprising:
   receiving, by a receiver, first data encoded in a first numerology at a first set of tones;

receiving, by the receiver, second data encoded in a second numerology at a second set of tones separated from the first set of tones;

receiving, by the receiver, third data in a third set of tones of a guard band, the third set of tones separating the first set of tones and the second set of tones, the third data having been encoded by multiplexing the third data encoded in the first numerology with the third data encoded in the second numerology, wherein the first data in the first set of tones, the second data in the second set of tones, and the third data in the third set of tones are simultaneously received by the receiver; and recovering the first data from the first set of tones, the second data from the second set of tones, and the third data from the third set of tones of the guard band, wherein the third data is recovered from the third set of tones of the guard band under either one of the first numerology or the second numerology.

7. The method of claim 6, wherein the first numerology is a normal cyclic prefix numerology and the second numerology is an extended cyclic prefix numerology.

8. The method of claim 6, wherein the first numerology is a normal cyclic prefix numerology and the second numerology is an indoor numerology.

9. The method of claim 6, further including receiving the first data, the second data, and the third data.

10. The method of claim 9, wherein receiving the first data, the second data, and the third data comprises performing weighted overlap add processing.

11. A method of transmitting data, comprising:

transmitting, by a frequency division multiplexed transmitter, first symbols of a first numerology in a first set of frequency tones of the transmitter;

transmitting, by the transmitter, second symbols of a second numerology in a second set of frequency tones of the frequency division multiplexed transmitter, a ratio of spacing between tones of the first numerology tones and the second numerology tones being an integer number K that is related to the ratio of the number of symbols transmitted by the first numerology and the number of symbols transmitted by the second numerology in a time period; and transmitting, by the transmitter, third symbols in a guard band located between the first numerology tones and second numerology tones, the third symbols in the guard band being encoded by multiplexing the third symbols encoded in the first numerology with the third symbols encoded in the second numerology such that when received by a receiver the encoded third symbols are decoded either under the first numerology or under the second numerology to receive the third symbols.

12. The method of claim 11, wherein the first numerology is normal cyclic prefix numerology, the second numerology is extended cyclic prefix, and K is two.

13. The method of claim 11, wherein the first numerology is normal cyclic prefix numerology, the second numerology is indoor numerology, and K is four.

14. An apparatus comprising:

a processor coupled to a memory and configured to execute instructions stored in the memory to encode a first data in a first numerology, encode a second data in a second numerology, and encode a third data by multiplexing the third data encoded in the first numerology with the third data encoded in the second numerology; and a transmitter coupled to the processor, the processor further configured to control the transmitter to:

receive from the processor the encoded first data, the encoded second data, and the encoded third data, and transmit the encoded first data at a first set of tones, the encoded second data at a second set of tones separated from the first set of tones, and the encoded third data in a third set of tones of a guard-band, the third set of tones separating the first set of tones and the second set of tones, wherein when the encoded third data is received it is decodable using either the first numerology or the second numerology.

15. The apparatus of claim 14, wherein the first numerology is a normal cyclic prefix numerology and the second numerology is an extended cyclic prefix numerology.

16. The apparatus of claim 14, wherein the first numerology is a normal cyclic prefix numerology and the second numerology is an indoor numerology.

17. The transceiver of claim 14, further comprising:

a receiver coupled to the processor, the receiver configured to:

receive a fourth data encoded in the first numerology at the first set of tones, a fifth data encoded in the second numerology at the second set of tones separated from the first set of tones, and sixth data encoded in the third set of tones of the guard-band, wherein the sixth data is interpretable under either the first numerology or the second numerology; and provide the fourth data, the fifth data, and the sixth data to the processor.

18. The transceiver of claim 17, wherein the fourth data, the fifth data, and the sixth data comprises performing weighted overlap add processing.

19. An apparatus comprising:

a processor; and a receiver coupled to the processor, the processor further coupled to a memory and configured to execute instructions stored in the memory to control the receiver configured to:

receive a first data encoded in a first numerology at a first set of tones, a second data encoded in a second numerology at a second set of tones separated from the first set of tones, and third data that was transmitted in a third set of tones of a guard-band, the third set of tones separating the first set of tones and the second set of tones, wherein the third data has been encoded by multiplexing the third data encoded in the first numerology with the third data encoded in the second numerology so that the receiver can decode the encoded third data under either the first numerology or the second numerology; and the processor further configured to control the receiver to:

receive the first data encoded in the first numerology, the second data encoded in the second numerology, and the third data encoded by multiplexing the third data encoded in the first numerology with the third data encoded in the second numerology into the processor, recover the first data under the first numerology and the second data under the second numerology, and recover the third data either under the first numerology or under the second numerology.

20. The apparatus of claim 19, wherein the first numerology is a normal cyclic prefix numerology and the second numerology is an extended cyclic prefix numerology.

21. The apparatus of claim 19, wherein the first numerology is a normal cyclic prefix numerology and the second numerology is an indoor numerology.

22. An apparatus, comprising:
means for transmitting a first data, a second data, and a third data,
wherein the first data is transmitted in a first numerology in a first band,
wherein the second data is transmitted in a second numerology in a second band, and
wherein the third data is transmitted in a guard band between the first band and the second band such that the third data is encoded by multiplexing the third data encoded in the first numerology with the third data encoded in the second numerology such that the encoded third data can be decoded by a receiver under either of the first numerology or the second numerology.

23. The apparatus system of claim 22, further comprising:
means for receiving a fourth data, a fifth data, and a sixth data,
wherein the fifth data is received in the first numerology,
wherein the fifth data is received in the second numerology, and
wherein the sixth data is received in the guard band such that the sixth data can be interpreted under either the first numerology or the second numerology.

24. An apparatus, comprising:
means for receiving a first data, a second data, and a third data, wherein the first data is received in a first numerology in a first band,
wherein the second data is received in a second numerology in a second band, and
wherein the third data is received in a guard band between the first band and the second band, the third data having been encoded by multiplexing the third data encoded in the first numerology with the third data encoded in the second numerology such that the encoded third data can be decoded under either of the first numerology or the second numerology; and
means for recovering the first data, the second data, and the third data.

25. A medium, comprising: a non-transitory computer-readable storage medium having one or more instructions stored thereon, which when executed by at least one processor causes the at least one processor to:
prepare for transmission first data encoded in a first numerology at a first set of tones;
prepare for transmission second data encoded in a second numerology at a second set of tones separated from the first set of tones;
prepare for transmission third data in a third set of tones of a guard-band, the third set of tones separating the first set of tones and the second set of tones, the third data encoded by multiplexing the third data encoded in the first numerology with the third data encoded in the second numerology such that the encoded third data can be decoded by a receiver under either the first numerology or the second numerology; and
communicate the first data, the second data, and the third data to a transmitter, which transmits the first data in a first band, the second data in a second band, and the third data in a guard band between the first band and the second band.

26. The storage medium of claim 25, further including instructions for
receiving a fourth data encoded in the first numerology, a fifth data encoded in the second numerology, and a sixth data encoded in the third set of tones of the guard band; and
interpreting the sixth data as either the first numerology or the second numerology.

* * * * *